May 23, 1967 R. J. KWIATKOWSKI 3,320,982
STRAIGHT BOARD AND SIDING GUIDE CUTTER
Filed Sept. 25, 1964 2 Sheets-Sheet 1

INVENTOR.
RUDOLPH J. KWIATKOWSKI
BY Charles L. Lovercheck
attorney 3,320,982
STRAIGHT BOARD AND SIDING
GUIDE CUTTER
Rudolph J. Kwiatkowski, 816 W. 3rd St.,
Erie, Pa. 16507
Filed Sept. 25, 1964, Ser. No. 399,308
4 Claims. (Cl. 143—6)

This invention relates to cutting guides for portable electric saws and, more particularly, to a cutting guide which may be adjusted to fit most kinds and sizes of electric saws for the cutting of straight cuts or angular cuts and also for rip guide cutting of wood, light metal or plastics.

Prior devices were designed either to be attached to the saw itself or were not perfectly reliable in straight or angular cuts. Other devices were designed for attaching to certain saws by bolts or screws and were not perfectly reliable in straight or angular cuts. Other devices were designed for attaching to certain saws by bolts or screws and were not truly portable.

This device is small enough to be taken to the job site and used with a simple adjustment for the size of the particular saw to be used.

Another object of this invention is to provide an improved cutting guide for powered hand saws.

Still another object of the invention is to provide a cutting guide mechanism which is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
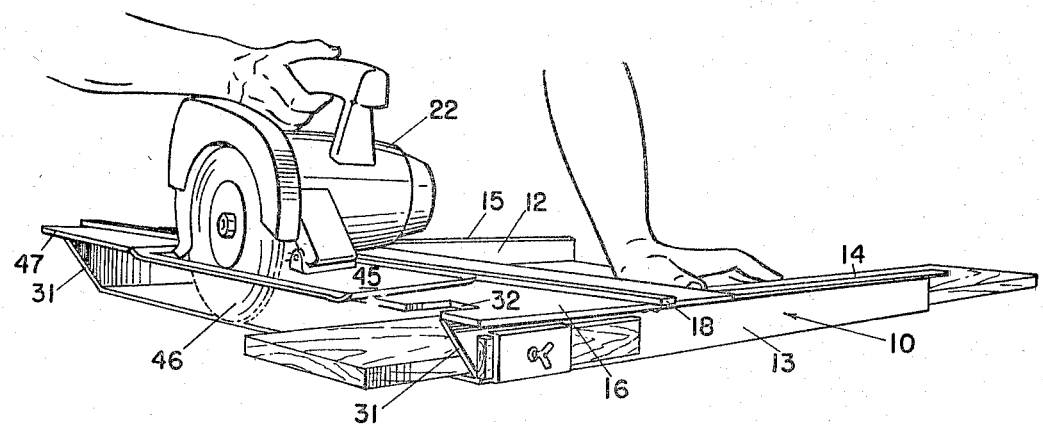
FIG. 1 is a perspective view of the saw and guide according to the invention in use.
Figure 2:
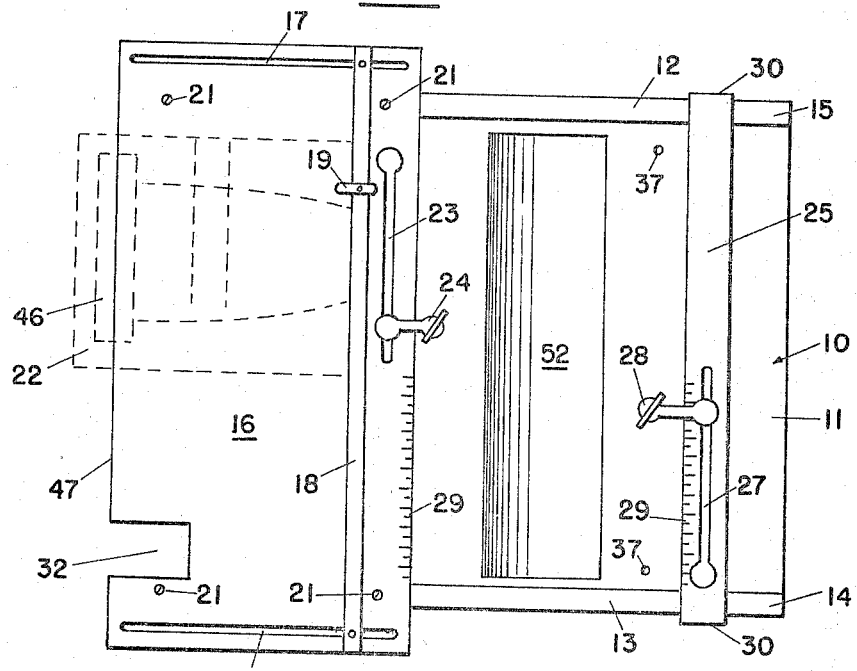
FIG. 2 is a top view of the saw and guide according to the invention.
Figure 3:
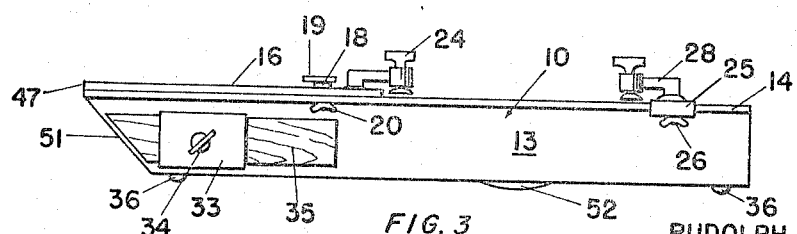
FIG. 3 is a side elevation of the invention.
Figure 4:
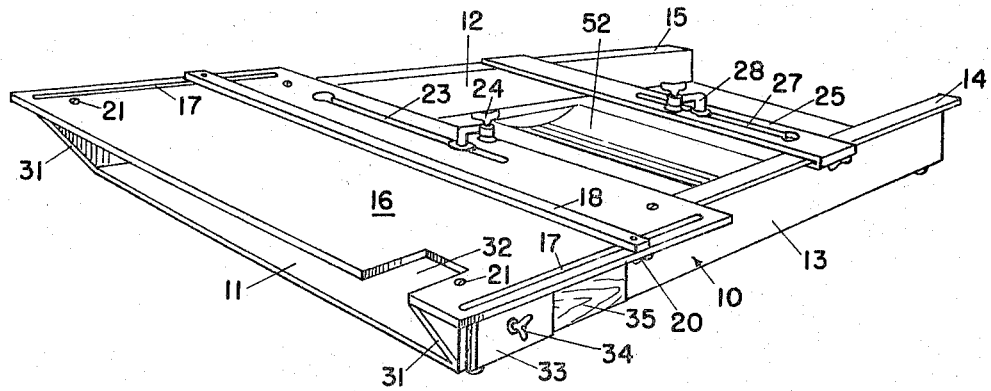
FIG. 4 is a perspective view showing the rip cutting guides.
Figure 5:
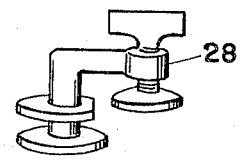
FIG. 5 is a perspective view of the clamping device of the invention.
Figure 6:
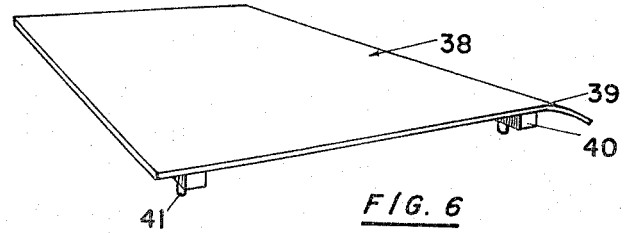
FIG. 6 is a perspective view of the riser mechanism used with the invention.

Referring more particularly to the drawings, FIG. 1 shows the portable electric saw 22 in cutting position for a straight cut. The saw 22 has a base 45, the light side of which is placed against the cutter guide bar 18 when a cut is being made. As the saw slides across the top surface 16, the blade 46 of the saw at the side of plate 47 which is projecting downward and to the side of plate 47 will engage the wood which has been placed therein. The wood must rest firmly against the side 13 of front angle 31 to give an accurate cut.

The invention may be made of aluminum or some other suitable material. The base 11 and sides 12 and 13 may be formed in one unit. The base will be rectangular in shape and of a width which will accommodate wood 14 inches wide. The length of the base should be 20 to 24 inches for usual applications. The front angles 31 may be flanged upwardly and of a height to accommodate wood 2 inches in thickness or greater if desired. The sides 12 and 13 will then be flanged outward at 14 and 15 to form a supporting surface. The front of the sides 12 and 13 will be cut at a 45° angle indicated at 51 so the saw may be adjusted for vertical angular cuts.

The side 13 will be provided with a marking guide holder 33 which will be U shaped in cross section and of a size to hold 1½ inch lattice board. This holder will be attached near the front to the side 13 and will have a set screw 34 threaded into the holder to hold the wood 35 therein firmly while it is being cut. The test wood strip 35 may slide out so the saw will cut it. This wood then may be checked for accuracy to determine if the saw is set at the exact desired angle.

The top saw supporting surface 16 may be rectangular in shape, the width being of approximately 18 inches and length approximately 9 inches, for example. The top will be attached to the flanges of the sides with countersunk screws 21. The guide slats 17 in the top surface will be parallel to the sides and will be located near the edge. The guide bar 18 will have threaded pegs on the bottom near the ends which will project down through the guide slots 17. Affixed to these threaded pegs will be threaded locks 20 which may be tightened to hold the guide bar 18 in position for cutting. The guide bar 18 may have a swing catch 19 attached which when turned will engage the top of the saw base and hold the saw on the top surface 16. This catch 19 also may be provided with a spring so that when the saw is pulled back after the cutting operation the catch will snap over and hold the saw in position.

The back part of the top surface 16 will also be provided with a rip clamp slot 23. This slot 23 will run at right angles to the guide slots 17 and will be provided with the saw clamp 24. Parallel to this slot 23 will be a rip guide bar 25 which will also have a clamp slot 27 with a clamp 28 therein. The base of the saw 22 may be placed on the top surface 16 and across the opening to the rip guide bar 25. The saw will be held in position for ripping by clamps 24 and 28. The ends 30 of the rip guide bar 25 will be U shaped and will receive the flange 15 and 14 therein and have a screw type lock 26 on the bottom to hold the bar 25 in position. The rip guide bar 25 and the saw top surface 16 will be provided with calibration 29 so the saw may be set at the proper distance for ripping a board.

The top saw supporting surface 16 will have an opening 32 adjacent to the angle 31 for viewing the angle cut when the saw is set for this purpose.

The base 11 will be provided with rubber coasters 36 on the bottom of each corner. These coasters 36 will protect the surface upon which the cutter guide 10 is placed during its use.

The base 11 will be also provided with a dished out groove 52 which will extend across the surface of the base. This groove will be located between the top supporting surface 16 and the rip guide bar 25 and the groove will provide the necessary clearance for the saw blade during the ripping process. The groove 52 also will have a tendency to give strength to the base 11.

A riser attachment 38 will be provided which will be used supported on the base 11 and will have a flat top surface which will slope downwardly at 39 so that when a board is fed into the guide it will slide up and into position. The bottom of the riser attachment will have height blocks 40 extending across the bottom and pegs 41 on the corners to reciprocate with the base peg holes 37 in the base. The purpose for the riser is to raise smaller pieces of wood in a closer proximity to the saw blade.

It may be seen that the adjustable guide bar 18 which is attached to the top surface 16 may be moved in and out to accommodate all sizes of electric portable hand saws and electric saber saws.

With the invention described above, the cutter guide is truly portable and self-contained and can be carried from place to place without difficulty or without requiring the presence of any special table or supporting surface. In addition, it can be stored without disassembling. Furthermore, it is compact and designed to cut straight and angles quickly, easily, and more safely.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A saw guide and work holder comprising
   a sheet-like member bent upwardly at its side edges thereby forming an intermediate part and two spaced flanges extending generally parallel to each other and at right angles to the intermediate part,
   the distal ends of said flanges being bent outwardly from said flanges, the upper part of said ends forming supporting surfaces,
   a plate-like member supported on said supporting surfaces,
   said plate-like member being disposed generally parallel to said intermediate part and defining a work receiving space therebetween adapted to receive a board to be cut,
   an adjustable guide bar disposed on said plate-like member,
   the ends of said plate-like member projecting laterally from the said flanges and extending longitudinally over said flanges and terminating at one end of said flanges,
   a slot in each said end of said plate-like member, said slots being generally parallel to said flanges,
   a guide lock extending through each end of said guide bar and through each said slot,
   said plate-like member being adapted to support an electric saw having a base with said base slidably engaging said guide bar and the blade of said saw overhanging an end of said plate-like member.

2. A saw guide and work holder comprising
   a sheet-like member bent upwardly at its side edges thereby forming an intermediate part and two spaced flanges extending generally parallel to each other and at right angles to the intermediate part,
   a plate-like member supported on said flanges,
   said plate-like member being disposed generally parallel to said intermediate part and defining a work receiving space therebetween adapted to receive a board to be cut,
   an adjustable guide bar disposed on said plate-like member,
   the ends of said plate-like member projecting laterally from the said flanges and extending longitudinally over said flanges and terminating at one end of said flanges,
   a slot in each said end of said plate-like member, said slots being generally parallel to said flanges,
   a guide lock extending through each end of said guide bar and through each said slot,
   said plate-like member being adapted to support an electric saw having a base with said base slidably engaging said guide bar and the blade of said saw overhanging an end of said plate-like member.

3. The guide recited in claim 1 wherein the ends of said flanges are inclined upwardly and outwardly and terminate at the ends of said intermediate member at the bottom thereof.

4. The guide recited in claim 2 wherein a rip guide bar is supported on said flanges in spaced relation to said plate-like member and adapted to receive one side of said saw base therebetween and means on said plate-like member for attaching to said saw base with the blade of said saw in a plane parallel to said flanges whereby boards may be ripped when moved through said space between said flanges.

References Cited by the Examiner

UNITED STATES PATENTS

| 1,960,590 | 5/1934 | McKay | 143—6 |
| 2,739,624 | 3/1956 | Haddock | 143—6 |
| 2,949,139 | 8/1960 | Nolte | 143—6 |

DONALD R. SCHRAN, *Primary Examiner.*